April 21, 1964    W. M. NONNAMAKER    3,129,743
PUNCTURE SEALANT-SAFETY DIAPHRAGM MEANS FOR PNEUMATIC
TIRES AND COMBINATIONS THEREOF WITH PNEUMATIC TIRES
Filed June 27, 1962      2 Sheets-Sheet 1

INVENTOR.
WILLIAM M. NONNAMAKER
BY Oldham & Oldham
ATTYS.

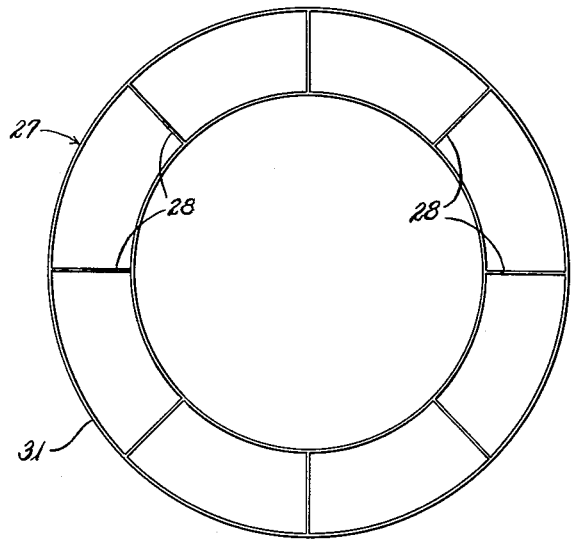
FIG. 5
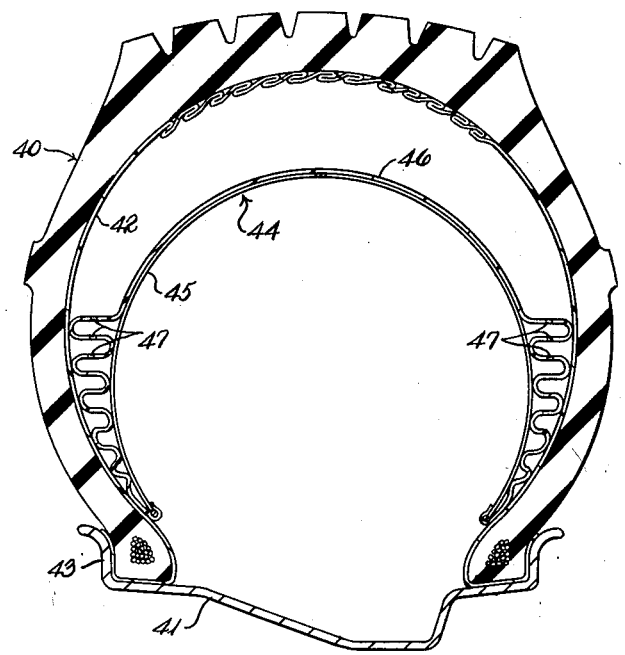
FIG. 6
FIG. 7
INVENTOR.
WILLIAM M.
NONNAMAKER
BY Oldham & Oldham
ATTYS.

United States Patent Office 3,129,743
Patented Apr. 21, 1964

3,129,743
PUNCTURE SEALANT-SAFETY DIAPHRAGM MEANS FOR PNEUMATIC TIRES AND COMBINATIONS THEREOF WITH PNEUMATIC TIRES
William M. Nonnamaker, Akron, Ohio, assignor to The Mohawk Rubber Company, Akron, Ohio, a corporation of Ohio
Filed June 27, 1962, Ser. No. 205,626
7 Claims. (Cl. 152—341)

The present invention relates to a puncture sealant-safety diaphragm means or member and to combinations of these means with a pneumatic tire for puncture sealant action therein and/or for providing a safety diaphragm action in a pneumatic tire for air retention action upon a tire puncture or failure.

Heretofore there have been many different types of puncture sealant means provided for pneumatic tires, and several different styles of safety diaphragm means have been provided heretofore for pneumatic tires. Some of such constructions are of the types shown in United States Letters Patents Nos. 2,756,800 and 2,874,744. Such safety tire constructions as proposed heretofore have comprised some flexible liner member that is adapted to be secured within a tire by compression engagement between the tire beads and a wheel or rim on which the tire is operatively positioned. The safety tire hence includes a liner member, impervious to air, that is removably associated with a tire on the radially inner surface thereof to provide one air receiving chamber therein, and the safety tire may also include an inextensible second diaphragm operatively associated with the first diaphragm to form one air chamber therebetween, and to provide an internal air chamber between the second diaphragm and associated rim or wheel portions. Special valve means are provided in safety tires of this type for slow leakage of air from the radially inner air chamber to the radially outer air chamber for inflation of both such chambers for normal operation and use of the safety tire. However, when the tire fails, or the outer liner is punctured, then the safety diaphragm and the inner air chamber are designed to retain air therein and possibly only slowly leak it therefrom on tire failure to permit the tire to support a load for a reasonable length of time to permit the vehicle on which the tire is positioned to be stopped safely, or to be driven to a service station or other location where a tire can be repaired or changed with safety.

Many different types of safety tires and tires as provided today are of the so-called "tubeless" type wherein one portion of the air chamber is formed from the rim or wheel on which the tire is positioned and some conventional type of a valve means is secured to the tire or rim for inflation of the tubeless tire.

All of the safety tires known to me have been relatively expensive to produce, and some of such safety tires have been rather difficult to assemble upon a tire or a tire rim or wheel. In other instances, special valve means must be provided in the safety tires to permit air passage between different chambers provided in the tire, or the safety tires may have been objectionable for other reasons. Air impervious materials, such as butyl rubber, have been used widely in tires in the form of liners or sheets placed on the inner surface of the tire, or provided in other ways in the safety diaphragms for air retention action, and any desired use thereof may be made in practice of the present invention.

The general object of the present invention is to provide a novel and improved puncture sealant-safety diaphragm means for use with pneumatic tires and where such means is characterized by the provision of a thin plastic sheet that is loosely associated with the internal surface of a pneumatic tire when operatively positioned.

A further object of the invention is to use a conventional thin flexible impervious plastic sheet the lateral edges of which are sealed and held in position by the tire beads when operatively positioned on a tire rim or wheel and where the center portion of the plastic sheet is larger in radial width than the corresponding internal radial width of the pneumatic tire whereby the plastic sheet is overlapped in portions of the tire and is forced against but movable with relation to the tire surface by air pressures set up within the tire to provide an air impervious layer therein to replace a tube and make a conventional tire function as a tubeless tire.

Another object of the invention is to provide a pneumatic tire sealing means including an annular carrier frame for removable, resilient positioning within a pneumatic tire, which carrier frame has a flexible, thin plastic sheet secured to radially inner portions thereof and which plastic sheet has a center section adapted for loose association with the internal surface of the tire for puncture sealing and safety diaphragm action therein upon tire puncture or failure.

A further object of the invention is to provide a plurality of flexible plastic sheets operatively positioned in radially spaced relation within a pneumatic tire with the radially outer plastic sheet being adapted to provide puncture sealant and air retention action for the tire, and with the radially inner plastic sheet being operatively positioned by a removable annular carrier frame and including a portion for safety diaphragm action in the tire upon tire failure for at least temporarily retaining pressure within the tire upon failure of the tire body.

Yet another object of the invention is to provide an inexpensive puncture sealant means that is easily assembled within a pneumatic tire.

The foregoing and other objects and advantages of the invention will be made more apparent as the specification proceeds.

Attention now is particularly directed to the accompanying drawings, where:

FIG. 5 is a side view of an annular carrier frame such as is used with the safety diaphragm means shown in FIG. 3;

Figure 1:
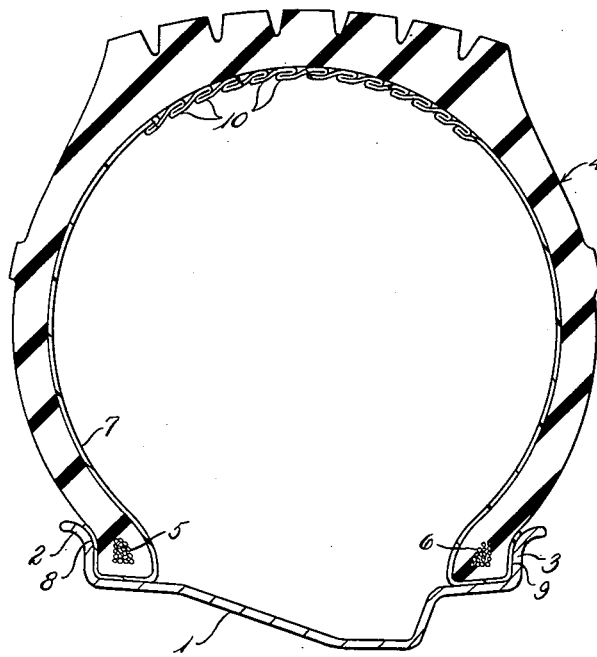
FIG. 1 is a vertical section through a pneumatic tire and wheel or rim combination having a puncture sealing diaphragm embodying the principles of the invention operatively associated therewith and positioned thereby.
Figure 2:
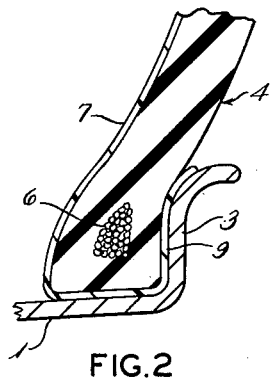
FIG. 2 is an enlarged fragmentary vertical section through an edge portion of the puncture sealant diaphragm and the associated tire bead and rim or wheel flange.

FIG. 6 is a vertical section through yet a further modification of a combination of a pneumatic tire and rim or wheel with a plurality of puncture sealant and/or safety diaphragm means of the invention; and FIG. 7 is a fragmentary vertical section through the puncture sealant sheet and tire assembly shown in FIG. 1 showing the action thereof when a nail or other member penetrates through the tire body in the tread area thereof.

When referring to corresponding members shown in the drawings and referred to in the specification, corresponding numerals are used to facilitate comparison therebetween.

The present invention, generally speaking, relates to the operative combination of a tire rim having edge flanges thereon, a pneumatic tire operatively positioned on the tire rim between the edge flanges thereof, and a puncture sealant layer comprising a flexible, thin, impervious plastic sheet secured along its lateral edges intermediate the rim and rim flanges and the tire beads to be operatively positioned thereby, which plastic sheet has a center section of a width greater than the length of the internal surface of a radial section of the tire so that the center portion of the plastic sheet includes overlapped portions lying against the internal surface of the tire for puncture sealing action therein. The invention also includes the provision in the tire and rim combination defined above of an annular carrier frame that is loosely but resiliently positioned within the tire to engage the tire sidewalls adjacent its beads and which carrier frame includes substantially radially extending means and a plurality of radially inner and outer annular member securing such means together and adapted to have the radially inner annular members contact the tire sidewalls, and a relatively tough plastic sheet secured at its lateral margins to the radially inner annular members and having an impervious center section lying radially outwardly of the carrier frame for engaging the inner surface of the tire for safety diaphragm action therein upon tire failure.

Attention now is particularly directed to the details of the structure shown in the accompanying drawings, and a conventional tire rim 1 is shown that has rim flanges 2 and 3 provided thereon. While the term "rim" is particularly used in defining the member 1, it should be understood that this rim may be an integral part of a wheel, or it may be a separate member of any known construction. In the construction shown in the present invention, a tire 4 is shown operatively positioned on the rim 1 by having bead portions 5 and 6 of the tire engage the edge flanges 2 and 3 of the rim, in a conventional manner so as to be in air tight, or sealed engagement therewith. This tire 4 is of any conventional construction, and the rim 1 may have any known type of valve means associated therewith for tire inflation action.

It is an important feature of the invention that a puncture sealant layer in the form of a flexible, thin, impervious plastic sheet 7 is secured along its lateral edges at sections 8 and 9 thereof to the tire and rim assembly. Such engagement is obtained by positioning the sheet 7 so that its lateral edges 8 and 9 extend along the radially inner surfaces of the tire beads 5 and 6 and then extend up between such tire beads and the rim flanges 2 and 3 whereby the sheet 7 is locked or sealed in air tight relationship to the tire and wheel assembly for puncture sealant action, as hereinafter described. Specifically, this plastic sheet 7 may be made from any known tough, air-impervious plastic material, such as "Mylar" which is a polyester film, made by the Du Pont de Nemours & Company, or polyvinyl fluoride, or the fluorinated co-polymer of ethylene-propionate.

It particularly is a feature of the invention that this plastic sheet 7 may be of a conventional composition and thickness, and it may be quite thin as these plastic sheets are very tough and impervious even in very thin sections, such as about .001 to .005 inch in thickness.

The inventive concept includes both loosely positioning the sheet 7 in frictional, compressive engagement with the tire beads 5 and 6 in the manner shown, and the invention also contemplates that these edge portions 8 and 9 may be attached by suitable adhesives of any conventional type to the tire beads 5 and 6, for example, to the radially inner surfaces thereof and to the laterally outer portions of the tire beads prior to the positioning of the tire 4 on the rim 1.

FIG. 1 of the drawings clearly brings out the fact that the center portion of the sheet 7 is of a width greater than the length of the inner surface of the radial section of the tire 4 so that the center portion of the plastic sheet 7 includes overlapped portions 10 that lie loosely against or are forced against the inner surface of the tire 4 by a pressure set up within the compartment provided by the rim 1 and tire 4. Thus by having these folds, or overlapped sections in the sheet 7, when a member such as a nail 11 punctures the tread portion of the tire 4, the sheet 7 is sufficiently strong and is loosely enough associated with the tire body even when air pressure is provided therein, that the impervious sheet 7 would not be punctured and a puncture sealant action is provided by the center portion of the sheet 7. It will be realized that the length or width of the sheet 7 needs not be as great as that shown in FIGS. 1 and 7, but that only a few radially overlapped sections may exist at different portions of the center part of the sheet and that an effective puncture sealant action will still be obtained.

Figure 3:
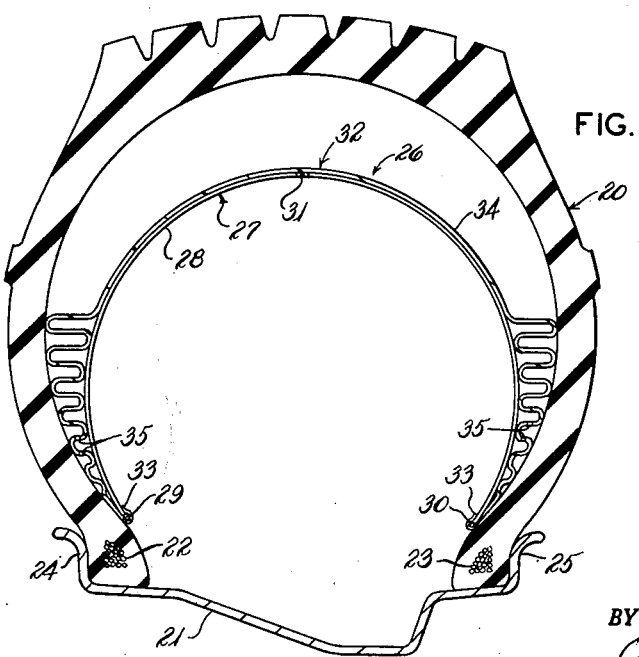
FIG. 3 is a vertical section, similar to FIG. 1, of a modified embodiment of the invention showing a puncture sealant diaphragm or sheet positioned by an annular carrier frame removably carried by a pneumatic tire.
Figure 4:
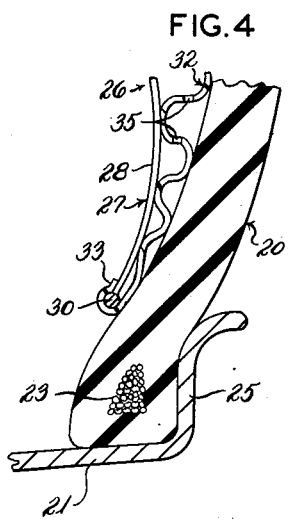
FIG. 4 is an enlarged fragmentary vertical section through a bead portion of a tire and associated portions of the safety diaphragm and rim flange means.

FIGS. 3 and 4 of the drawings best show a modification of the invention wherein a conventional tubeless tire 20 is positioned upon a wheel or rim 21. Bead portions 22 and 23 of the tire are engaged by rim flanges 24 and 25, respectively, to position the tire. It is a feature of this tire assembly that a pneumatic tire puncture sealing and/or safety diaphragm means 26 is removably and operatively associated with and positioned internally of the tire 20. This safety diaphragm means 26 includes an annular, resilient carrier frame 27, as best shown in FIG. 5 of the drawings. The carrier frame 27 preferably is formed from a suitable resilient, readily moldable but fairly strong plastic material such as polyethylene, or similar plastic materials, and it comprises a plurality of generally radially extending means or hoops 28 that are secured together in unitary relationship by a plurality of annular members 29, 30 and 31. These annular members may be of any desired shape, or shapes in cross section and usually are formed integrally with the means or hoops 28. The annular members 29 and 30 are provided at the radially inner portions of the carrier frame 27 and are positioned or are of a size as to engage resiliently with the inner surface of the tire 20 spaced radially outwardly from the beads 22 and 23 thereof. The annular member 31 usually is positioned at the radially outermost portions of the hoops 28. The safety diaphragm means 26 of the invention also includes a flexible plastic sheet or layer 32 that has edge portions 33 thereof that are tacked to, or wrapped around and suitably secured, as by conventional adhesive bonding means or by a heat sealing action to the annular members 29 and 30. A center impervious portion 34 of the layer 32 loosely lies over and is positioned on the radially outer surface of the carrier frame 27. The center portion 34, in association with the remainder of the layer 32, is of such a width, or length radially of the tire as to be longer than the length of the radially inner circumferential section of the tire whereby this sheet or layer 32 can be moved from a position as shown in FIG. 3 outwardly of the tire to be forced against the inner surface of the tire more or less like the layer or sheet 7 as shown in FIG. 1, and such sheet 32 can have some folded or overlapped areas in its extended position, or not, as desired.

By positioning the safety diaphragm means 26 of the invention removably within the tire 20, and by providing such means of annular shape, the safety diaphragm means 26, in an inflated tire, will take a position concentric with the tire and maintain such position for all normal actions and use of the tire. Furthermore, when the tire 20 is inflated by the normal inflation valve means provided in association with the rim 21, air will flow past such safety diaphragm means 26, in most instances, at the connection or joint formed between the edges 33 of the plastic layer 32 and associated surfaces of the tire sidewall. In order to facilitate flow of air to the radially outer compartment formed in the tire intermediate the layer 32 and the tire carcass, a plurality of apertures 35 may be provided in the laterally outer, or edge portions of the layer 32 adjacent the annular members 29 and 30. Any suitable number and size of the apertures 35 may be provided but with such apertures only being formed spaced appreciably from the center portion of the layer 32. Hence when failure occurs in the tire 20, or when a puncture is made therein, the air pressure within the layer 32 will rapidly force the center portion 34 of such layer out against the tire sidewall body and close or seal the puncture or failure of the tire to at least temporarily retain an operative air pressure within the tire 20 so that the vehicle on which the tire 20 is mounted can be safely stopped, or could be driven a short distance in some instances.

The material forming the layer 32 may be the same material as that forming the sheet 7, or a stiffer or tougher plastic material may be used. Hence such layer 32 may be, for example, between about .005 inch to about .020 inch, in thickness so that a strong layer is provided to form a safety diaphragm for air retention action for a tire for emergency use when a blowout, or similar failure of the tire 20 occurs.

FIG. 6 of the drawings shows a novel tire and rim combination of the invention and in this instance a conventional tubeless tire 40 is shown that is positioned upon a conventional rim 41. In this instance, an inner liner or sheet 42 is provided from a plastic material, like the sheet 7 of FIG. 1, and with such sheet 42 likewise being positioned by being compressed between the tire beads and flanges 43 on the rim. Such lateral margins of the sheet 42 may be cemented to the tire beads, or be merely compressibly positioned thereby, as desired. The tire 40 also has positioned therein a safety diaphragm means 44 similar to the safety diaphragm means 26 of FIG. 3. Hence an annular carrier frame 45 is provided that has a relatively tough, sturdy, but flexible sheet 46 secured thereto at the lateral margins of the sheet, as in the structure described in FIG. 3. Again, a plurality of apertures 47 may be provided in the laterally outer portions, or edges of the sheet 46 adjacent the radially inner portions of the carrier frame 45. This sheet 46 may be of size, as indicated hereinbefore, as to be snugly and evenly tightly forced against the tire, or to be forced in folded over or overlapped relationship in some areas thereof against the tire when the sheet 46 is expanded out against the internal surface of tire 6.

Yet another modified concept of the present invention would be to provide a sheet 46 of a size as to be loosely carried by the carrier frame 45, but with no perforations being provided therein, and with the sheet being of a size in a radial arc when extended from the frame 45 to be equal to the internal dimensions of the tire. By providing a tougher, thicker sheet 46 than the sheet 42, even when such sheet 42 fails, the sheet 46 will serve as a safety diaphragm in the tire.

It is believed that provision of the apertures 35 in the sheet 34, and of apertures 47 in the sheet 46, will aid such sheets in more or less floating between their carrier frames and the tires in which they are positioned. However, on tire failure, the sheets 34 and 46 will be ready for sealing action in the tire, when needed.

If the sheet 7 is cemented to the tire, it may be secured at local areas only to the tire beads, or be secured to them around their entire circumferences. Also, the annular frame 27 may be secured within a tire in the same manner at the radially inner members 29 and 30, which may be of flat strip form in section to lie against the tire body.

In some instances, it may be desirable to mold, extrude, or shape the sheets 7 and 42 particularly, and even the sheets 26 and 46, to substantially the shapes shown. Also, the outer surfaces of the sheets, in the tire crown engaging portion thereof, may have ribs or beads formed on their outer surfaces and extending radially and/or circumferentially of the tire to prevent excessive suctional or other adhesion between the layers or sheets of the tire body.

The sheet 7 may have a minimum of, or even no, radially overlapped sections therein when it is serving as an air impervious barrier in the tire to convert a conventional tire into a tubeless tire. The sheet 7 could be manually or otherwise pressed out into engagement with the tire 4 or it could be positioned in the tire with a small volume of air between the sheet and the tire before the edges of the sheet are bonded to the tire beads to provide a barrier to passage of air through the tire.

It should be realized that the radially inner portions of the hoops 28 and 45 would normally be compressed laterally towards each other when positioned in a tire. Also, the annular frames 27 and 45 may only require one annular member at the radially outer portion thereof when the plastic sheets are secured to the radially inner portions of the hoops, or the radially outer annular band may be omitted in some instances and still obtain satisfactory sheet support and positioning action by the carrier frame.

From the foregoing, it will be seen that a relatively inexpensive puncture sealant, air retention layer has been provided in a conventional tire, and that such layer may be either removably or be permanently bonded to the tire and be held in position by the tire when placed onto a conventional tire rim or wheel. The invention also provides a second safety diaphragm means in a tire and wheel assembly whereby a different type of a support action can be provided for the safety or puncture sealant diaphragm. Such safety diaphragm means can be removably positioned in a tire and will not interfere appreciably with the action of mounting or dismounting a tire with relation to a carrier rim, so that an inexpensive, but improved safety diaphragm means has been provided by the invention. Hence it is believed that the objects of the invention have been achieved.

While several complete embodiments of the invention have been disclosed herein, it will be appreciated that modification of these particular embodiments of the invention may be resorted to without departing from the scope of the invention as defined in the appended claims.

What I claim is:

1. A pneumatic sealing safety diaphragm means for use in a pneumatic tire and comprising
    an open annular carrier frame for positioning internally of a tire and made from a plurality of separate annular members at least some of which are spaced radially from each other and a plurality of separate circumferentially spaced radially extending hoop means secured to and extending between said annular members,
    a pair of said annular members forming base means for said carrier frame to engage tire sidewalls, and
    a flexible thin plastic sheet secured at its lateral margins to said base means and extending loosely over the radially outer portions of said hoop means,
    said plastic sheet having apertures in its only adjacent lateral portions to enable air to pass therethrough into an outer chamber provided in a tire with which the safety diaphragm means is operatively associated and having an impervious center section which can be forced radially outwardly against the circumference of a tire surface upon tire failure for sealing action.

2. In combination,
    a tire rim having edge flanges thereon,
    a pneumatic tire operatively positioned on said tire rim between said flanges,
    a puncture sealant layer comprising a flexible thin impervious plastic sheet of up to about .005" in thickness secured along its edges intermediate said rim and rim flanges and said tire beads to be operatively positioned thereby,
    said plastic sheet having a center section of a width greater than the length of the inner surface of a radial section of said tire whereby such center portion of said plastic sheet includes overlapped portions lying against the internal surface of said tire for puncture sealing action therein, an annular carrier frame loosely positioned within said tire to engage the tire sidewalls adjacent its beads and including circumferentially spaced radially extending hoop means and a plurality of radially inner and radially outer annular members which are the only means that extend between and secure said hoop means together, said radially inner members contacting said tire sidewalls, and a relatively tough plastic sheet secured at its lateral margins to said radially inner annular members and having an impervious center section lying radially outwardly of said carrier frame for engaging said tire for safety diaphragm action therein.

3. In combination, a tire rim having edge flanges thereon, a pneumatic tire operatively positioned on said tire rim between said flanges, a puncture sealant layer comprising a flexible thin impervious plastic sheet secured along its edges intermediate said rim and rim flanges and said tire beads to be operatively positioned thereby, said plastic sheet having a center section of a width greater than the length of the inner surface of a radial section of said tire whereby such center section of said plastic sheet will have overlapped portions lying against the internal surface of said tire for puncture sealing action therein, an open annular carrier frame loosely positioned within said tire and including circumferentially spaced radially extending means and a plurality of spaced annular members forming a unit with said means, said carrier frame being resiliently engaged with said tire sidewalls adjacent the beads thereof by a pair of said annular members, a second plastic sheet secured at its lateral margins to said pair of annular members and having an impervious center section lying radially outwardly of said carrier frame and of a normal size for engaging the tire for safety diaphragm action therein, said second plastic sheet having apertures only in lateral portions thereof to enable air to pass to a chamber defined between said plastic sheets.

4. A safety diaphragm means for use in a pneumatic tire and comprising a carrier frame for positioning internally of a tire and including at least one annular member and a plurality of circumferentially spaced separate radially extending hoop means secured to said annular member to form an open support frame therewith, and a flexible thin plastic sheet secured at least at portions of its lateral margins to said carrier frame and having a center portion extending loosely over the radially outer surfaces of said hoop means, said plastic sheet having an impervious center section which is of a size to and is free to be forced outwardly against a tire body in which the safety diaphragm means is mounted upon tire failure for air sealing action in a chamber formed between such tire and a rim on the tire is mounted.

5. A pneumatic sealing safety diaphragm means for use in a pneumatic tire and comprising a reticulated annular carrier frame for resilient positioning internally of a tire and including a plurality of annular members at least some of which are spaced radially from each other and a plurality of substantially radially extending means secured to and being the only means extending between said annular members, a pair of said annular members forming base means for said carrier frame, and a flexible thin plastic sheet secured only at its lateral margins to said carrier frame at said base means and extending loosely over the outer surfaces of said radially extending means, said plastic sheet having an impervious center portion of a normal length in a radial direction to extend out to the inner surface of a tire in which said carrier frame is positioned, and said plastic sheet center portion being free to be forced outwardly against a tire surface upon tire failure for sealing action.

6. In combination, a tire rim having edge flanges thereon, a pneumatic tire operatively positioned on said tire rim between said flanges, a reticulated annular carrier frame loosely positioned within said tire and made from several circumferentially spaced radially extending means and a plurality of annular members, including a pair of radially inner members, connecting to and forming the sole members securing said means together, said carrier frame resiliently bearing on said tire sidewalls adjacent the beads thereof by said pair of said annular members, a puncture sealant layer comprising a flexible thin impervious plastic sheet operatively secured along its lateral edges intermediate said rim and rim flanges, said plastic sheet having a center section of a width greater than the length of the inner surface of a radial section of said tire whereby such center section of said plastic sheet can have overlapped portions lying against the internal surface of said tire for puncture sealing action therein, and a second plastic sheet secured at its lateral margins to said pair of annular members and having an impervious center section lying radially outwardly of said carrier frame for engaging the tire for safety diaphragm action therein, said second plastic sheet having apertures in lateral portions thereof to enable air to pass to a chamber defined between said plastic sheets.

7. In combination, a tire rim having edge flanges thereon, a pneumatic tire operatively positioned on said tire rim between said flanges, a puncture sealant layer comprising a flexible thin impervious plastic sheet operatively positioned within said tire and adapted to lie against the inner surface of the tire carcass, said plastic sheet having a center section of a width greater than the length of the inner surface of a radial section of the portion of said tire with which it is associated whereby such center portion of said plastic sheet can have overlapped portions lying against the internal surface of said tire for puncture sealing action therein, said center section being free to move out radially to engage the tire carcass, a reticulated annular carrier frame loosely positioned within said tire and made from several circumferentially spaced radially extending means and a plurality of annular members, including a pair of radially inner members, connecting to and securing said means together, and a second plastic sheet operatively secured at its lateral margins to said pair of annular members and having an impervious center section lying radially outwardly of but next to said carrier frame for engaging the tire for safety diaphragm action therein, said second plastic sheet having apertures in lateral portions thereof to enable air to pass to a chamber defined between said plastic sheets.

References Cited in the file of this patent

UNITED STATES PATENTS

| | | |
|---|---|---|
| 616,516 | Wilson | Dec. 27, 1898 |
| 2,698,042 | Perkins | Dec. 28, 1954 |
| 2,853,115 | Church | Sept. 23, 1958 |
| 3,018,813 | Koch et al. | Jan. 30, 1962 |